Feb. 16, 1943. C. E. TANNEWITZ 2,311,268
AUTOMATIC BAND SAW BRAKING MECHANISM
Filed July 7, 1941 2 Sheets-Sheet 2

INVENTOR.
Carl E. Tannewitz
BY Earl F. Chappell
ATTORNEYS.

Patented Feb. 16, 1943

2,311,268

UNITED STATES PATENT OFFICE 2,311,268

AUTOMATIC BAND SAW BRAKING MECHANISM

Carl E. Tannewitz, Grand Rapids, Mich.

Application July 7, 1941, Serial No. 401,355

10 Claims. (Cl. 143—17)

This invention relates to improvements in automatic band saw braking mechanism.

The main objects of the invention are:

First, to provide an automatic mechanism for braking the blade wheels of a band saw in the event of breakage of the band saw blade, the same being practically instantaneous and very positive and effective in its operation.

Second, to provide an automatic, blade controlled braking mechanism of the type described incorporating hydraulic brakes and an electrically controlled master brake cylinder, which is characterized by the extreme simplicity and economy of construction of the parts.

Third, to provide a mechanism of the foregoing type having improved means enabling the actuating elements thereof to be held in inoperative position during installation of a new blade.

Further objects relating to details and economies of my invention will appear from the description to follow. The invention is defined in the claims.

A structure embodying the features of my invention is illustrated in the accompanying drawings, wherein.

Figure 1:
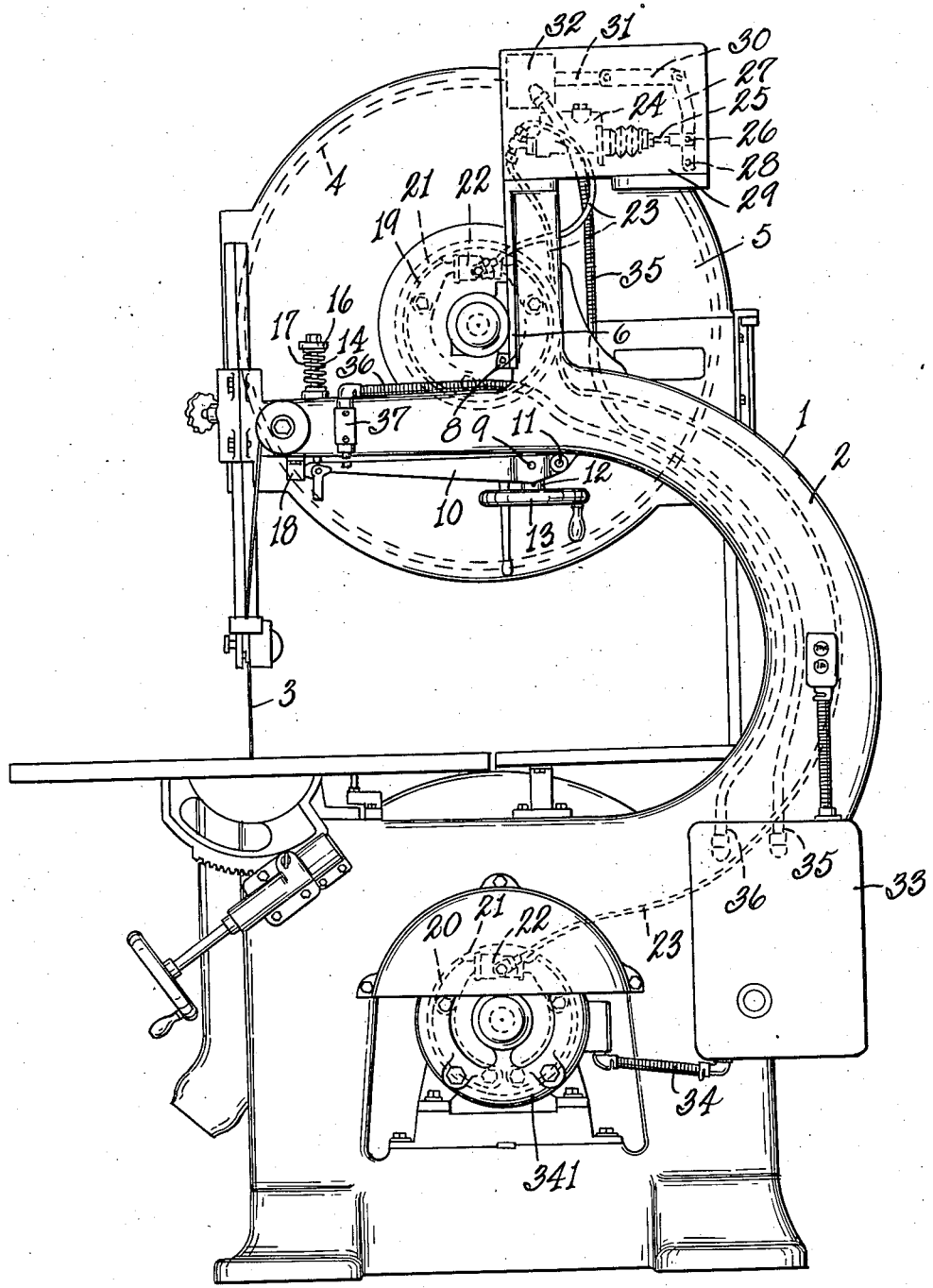
Fig. 1 is a view in side elevation illustrating a conventional band saw provided with the braking mechanism of my invention.

Referring to the drawings, reference numeral 1 designates in general a band saw of well known type including a frame 2 and driving and guiding wheels for the band saw blade 3, the uppermost of which is illustrated in dotted lines in Fig. 1 and designated by the reference numeral 4. This wheel is rotatably mounted in an annular guard 5, the guard, wheel and braking structure associated with the latter (to be described) being vertically adjustable on vertical ways 6 at the top of frame 2. For accomplishing this vertical adjustment of the upper wheel I employ a vertical screw 7 which threadedly engages the wheel mounting 8, which is slidable on the ways 6. The screw 7 is pivoted at 9 in a control lever 10 which is in turn pivoted at 11 on the frame 2. The screw is restrained by collars 12 from vertical movement relative to its pivot point 9 and a hand wheel 13 is attached thereto for rotating screw 7 and thereby vertically adjusting the upper wheel relative to the frame.

Adjacent its outer end the control lever 10, has a rod 14 pivoted thereon and extending upwardly through an aperture 15 in the projecting arm of the frame. Thrust collars 16 and an interposed coil compression spring 17 are associated with the rod 14 above the frame arm to the end that as the control 10 swings downwardly spring 17 will be compressed. Guide members 18 are mounted on the frame adjacent the swinging end of lever 10 for laterally supporting and guiding the same.

It will be appreciated from the foregoing that when a band saw blade is trained over the two wheels 4 and the screw 7 rotatably actuated to separate the wheels and tension the blade, the lever 10 tends to swing downwardly about its pivot point 11. This is resisted by spring 17. Should the blade break in operation spring 17 acts to swing control lever 10 upwardly about its pivot. This movement following breakage of the blade is employed for actuating the braking mechanism of my invention, which will now be described.

The reference numerals 19, 20 designate, respectively, pairs of brake shoes appropriately pivoted on the frame and coacting respectively with the brake drums 21 on the upper and lower band wheels respectively, these brake shoes being controlled in their expanding braking movement by hydraulic cylinders 22 and pistons (not shown) therein connected to the shoes. The brake liquid is supplied to the braking cylinders 22 through pressure lines 23 from a master brake reservoir and cylinder 24, it being understood that the liquid is compressed in the master cylinder by a suitable plunger (not shown) and in turn actuates the plungers in the respective wheel brake cylinders 22 to thereby apply brake shoes 19, 20 to their respective drums.

The plunger for the master brake cylinder 24 is connected to a rod 25 pivoted at 26 to a lever 27, which is in turn suitably pivoted at 28 within a brake control casing 29 carried by the frame. Lever 27 is pivoted at its free end to a tension link 30 which is actuated by the core 31 of a solenoid 32 in casing 29, it being understood that when solenoid 32 is energized the core 31 is drawn to the left as illustrated in Fig. 1, thereby actuating the master brake plunger in the same direction and compressing the hydraulic brake fluid in the master cylinder.

The actuation of solenoid 32 is controlled directly from the master electric switch, generally designated 33, from which one electrical conduit 34 carries energizing wires for the motor 341 of the band saw. Another conduit 35 leading from the master switch 33 to solenoid 32 carries the feed and return wires for the latter, while a third conduit 36 leads from the master switch 33 to a normally closed relay 37 mounted on the frame immediately adjacent and above control lever 10 and near the outer end of the latter. Relay 37 has a control button 38 projecting downwardly therefrom and the control lever 10 is provided with a lateral lug 39 engageable with button 38 when the control lever is actuated by spring 17 to its uppermost position. The solenoid 32, band saw motor and relay 37 are wired to the master switch 33 in such manner that when the relay button 38 is actuated by lug 39 solenoid 32 will be instantaneously energized and the motor deenergized. It has not been considered necessary to illustrate the wiring with particularity, inasmuch as an appropriate hook-up will readily suggest itself to those skilled in the art from the foregoing description.

Energizing of solenoid 32 results in instantaneous actuation of the brake shoes 19, 20 for effective braking action on the top and bottom blade guide wheels, simultaneous with which the motor for the saw is deenergized. As stated above this takes place when the band shoe brakes and the lug 39 on the lever 10 engages and actuates the relay switch button 38.

Figure 2:
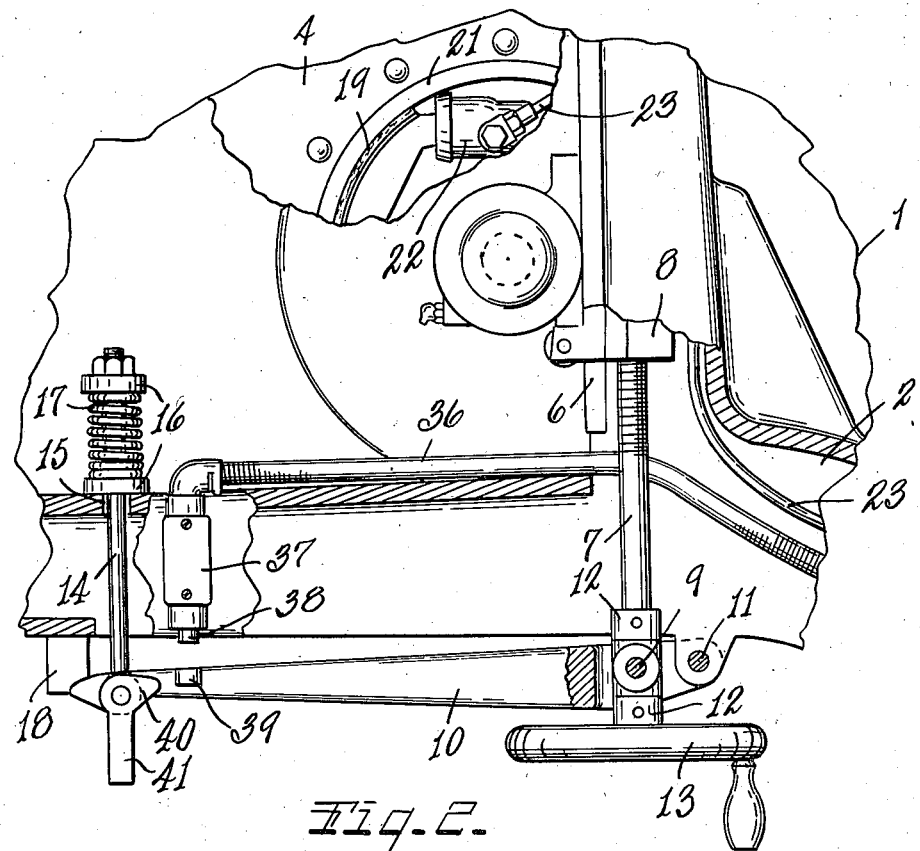
Fig. 2 is a fragmentary enlarged view partially broken away and partially in vertical section further illustrating certain control or actuating instrumentalities for the braking mechanism and Fig. 3 is a fragmentary view illustrating the control instrumentalities positioned preliminary to installation of the new blade on the band saw.
Figure 3:
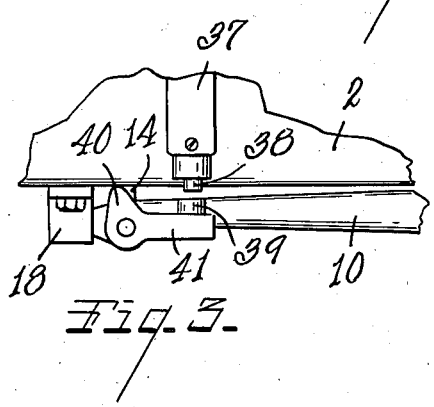

In order to enable the new saw blade to be installed, it is desirable to keep lug 39 out of actuating engagement with the switch button, hence I have pivotally mounted on the free end of lever 10 an L-shaped detent or holding dog 40 having a weighted tail 41. In installing the blade this dog is swung to the operative position illustrated in Fig. 3 so as to engage the frame, the tail 41 thereof engaging the lower side of lug 39 and limiting swinging movement thereof of the dog, and the dog maintaining lever 10 spaced from the switch button prior to tensioning of the blade. As the blade is properly tensioned arm 10 will commence to swing downwardly, thereby removing dog 40 from engagement with the frame whereupon weighted tail 41 swings the latter to the inoperative position shown in Fig. 2. Following this all that is necessary is to complete the energization of the machine as a whole by a suitable clutch, switch, or the like (not shown), for operation thereof.

It will be apparent from the foregoing description that the braking mechanism of my invention is highly simplified and economical in its parts, yet very positive and instantaneous in its operation. The braking system is bled of air so that the force of the incompressible brake liquid is transmitted immediately and directly to the parts. Following initial installation there is no need for attention to the machine save possible replenishing of the brake liquid; however, considering the infrequency of blade breakage and operation of the brake mechanism, this is practically never. There are a minimum of moving parts apt to become inoperative or require servicing and blade replacement is accomplished with ease and expedition, without requiring great skill on the part of the operator.

An embodiment of the invention which incorporates the principles of the invention in a highly desirable manner has been illustrated and described. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. In combination with a band saw including a frame, a pair of blade wheels rotatably mounted thereon, and a hydraulic brake device associated with each of said wheels, a master hydraulic control device hydraulically connected to said brake devices and operative to actuate the latter, a solenoid having a core reciprocable therein, means including a linkage connecting said core to said master hydraulic device for controllingly actuating the latter upon energization and deenergization of the solenoid, a switch electrically connected to said solenoid for controlling the energization thereof, an adjustable mounting for one of said wheels, including a wheel support moveably mounted on the frame, and means shifting the same vertically upon breakage of the blade into engagement with said switch to control the energization of said solenoid, and manually settable, holding means pivotally mounted on said support and engageable with said frame to prevent engagement of said support and switch when desired, said last named means being automatically releasable to inoperative position upon adjustment of the said wheel mounting to tension the blade.

2. In combination with a band saw including a frame, a pair of blade wheels rotatably mounted thereon, and a hydraulic brake device associated with at least one of said wheels, a master hydraulic control device hydraulically connected to said brake device and operative to actuate the latter, electrically energizable control means connected to said master hydraulic device for controllingly actuating the latter, a switch electrically connected to said control means for controlling the energization thereof, an adjustable mounting for one of said wheels, including a wheel support movably mounted on the frame, and means shifting the same vertically upon breakage of the blade into engagement with said switch to control the energization of said control means, and manually settable, holding means on said support engageable with said frame to prevent engagement of said support and switch when desired, said last named means being automatically releasable to inoperative position upon adjustment of the said wheel mounting to tension the blade.

3. In an automatic mechanism of the type described for a band saw including a frame and a saw blade guide wheel, an adjustable mounting for the guide wheel, a support pivoted on the frame, an adjusting member adjustably mounted on said support engageable with the wheel mounting for adjusting the same, resilient means resisting the pivotal reaction movement of said support in the opposite direction upon vertical adjustment of the wheel, said support being shifted vertically by said means when the saw blade breaks, a control element engageable and actuated by the support during said last named shifting movement thereof, and a dog pivoted on said support preventing actuating engagement of the support and control element in operative position of the dog, said dog being swingable to inoperative position when the tension of the blade is properly adjusted by adjustment of said wheel.

4. In an automatic mechanism of the type described for a band saw including a frame and a saw blade guide wheel, an adjustable mounting for the guide wheel, a support movably mounted on the frame, an adjusting member adjustably mounted on said support engageable with the wheel mounting for adjusting the same, resilient means resisting the reaction movement of said support in the opposite direction upon adjustment of the wheel, said support being shifted by said means when the saw blade breaks, a switch having a control element engageable and actuated by the support during said last named shifting movement thereof, a manually settable dog coacting with said support and frame and adjustably carried by one thereof, said dog preventing actuating engagement of the support and switch element in operative position of the dog, said dog being shiftable to inoperative position when the tension of the blade is properly adjusted by adjustment of said wheel, a brake control means operatively connected to said brake and switch, and controlled by the latter to actuate said brake upon engagement of said support with said switch control element.

5. In a braking mechanism for a band saw including a frame, top and bottom blade saw wheels rotatably mounted thereon, an adjustable mounting for one of said wheels vertically adjustable relative to the frame, an adjusting screw threadedly engaging said mounting, said frame having a control lever pivoted thereon in which said screw is swiveled, spring means interposed between said lever and frame for resisting vertical movement of the lever relative to the frame, a dog pivoted on said lever and engageable with the frame in operative position to maintain predetermined spacing of the lever and frame in opposition to said spring, a switch on the frame having a control element engageable and actuated by said lever when said dog is in inoperative position, electrically actuated braking means for at least one of said wheels operable when actuated to halt movement of the wheels, and electric connections between said last named means and switch to actuate said means when the control element of the switch is actuated by said control lever.

6. In a braking mechanism for a band saw including a frame, top and bottom blade saw wheels rotatably mounted thereon, an adjustable mounting for one of said wheels vertically adjustable relative to the frame, an adjusting member engaging said mounting, said frame having a control lever pivoted thereon in which said member is adjustably carried, adjustment of said member in said lever resulting in vertical adjustment of said wheel mounting, spring means interposed between said lever and frame for resisting vertical movement of the lever relative to the frame, an adjustable detent coacting with said lever and frame and carried by one thereof, said detent serving in operative position to maintain predetermined spacing of the lever and frame in opposition to said spring, a switch on the frame having a control element engageable and actuated by said lever when said detent is in inoperative position, and braking means associated with at least one of said wheels, said last named means being operatively connected to and controlled by said switch when the latter is actuated to halt movement of the wheels.

7. In a braking mechanism for a band saw including a frame, top and bottom blade saw wheels rotatably mounted thereon, an adjustable mounting for one of said wheels vertically adjustable relative to the frame, an adjusting member engaging said mounting, said frame having a control lever pivoted thereon in which said member is adjustably carried, adjustment of said member in said lever resulting in vertical adjustment of said wheel mounting, spring means interposed between said lever and frame for resisting vertical movement of the lever relative to the frame, an adjustable detent coacting with said lever and frame and carried by one thereof, said detent serving in operative position to maintain predetermined spacing of the lever and frame in opposition to said spring, a control element engageable and actuated by said lever when said detent is in inoperative position, and braking means associated with at least one of said wheels, said last named means being operatively connected to and controlled by said element when the latter is actuated to halt movement of the wheels.

8. In combination with a band saw including a frame, a pair of blade wheels rotatably mounted thereon, a brake device associated with at least one of said wheels, means including a control element on said frame connected to said brake device and operative when actuated to control the actuation of the latter, an adjustable mounting for one of said wheels including means shiftable vertically upon breakage of the blade into engagement with said control element to thereby actuate the latter and control the actuation of said brake device, and manually settable holding means pivotally mounted on said vertically shiftable means and engageable with said frame to prevent actuating engagement of said last named means with the control element when desired, said manually settable means being automatically releasable for movement to inoperative position upon adjustment of said wheel mounting to tension the blade.

9. In combination with a band saw including a frame, a pair of blade wheels rotatably mounted thereon, a brake device associated with at least one of said wheels, means including a control element on said frame connected to said brake device and operative when actuated to actuate the latter, an adjustable mounting for one of said wheels including means shiftable vertically upon breakage of the blade into engagement with said control element to thereby control the actuation of the latter and control the actuation of said brake device, and manually settable means coacting with said frame and vertically shiftable means and movably carried by one thereof to prevent actuating engagement of said vertically shiftable means with said control element when desired, said manually settable means being automatically releasable for movement to inoperative position upon adjustment of said wheel mounting to tension the blade.

10. In an automatic mechanism of the type described for a band saw including a frame, a brake device for said mechanism and a saw blade guide wheel, an adjustable mounting for the guide wheel, a support movably mounted on the frame, an adjusting member adjustably mounted on said support engageable with the wheel mounting for adjusting the same, resilient means resisting the reaction movement of said support in the opposite direction upon adjustment of the wheel, said support being shifted by said means when the saw blade breaks, a control element engageable and actuated by the support during said last named shifting movement, a manually settable dog coacting with said support and frame and adjustably carried by one thereof, said dog preventing actuating engagement of the support and control element in operative position of the dog, said dog being shiftable to inoperative position when the tension of the blade is properly adjusted by adjustment of said wheel, and means operatively connected to said control element, and controlled by the latter to operate said brake device upon engagement of said support with said control element.

CARL E. TANNEWITZ.